US011386596B2

(12) United States Patent
Gehlaut et al.

(10) Patent No.: US 11,386,596 B2
(45) Date of Patent: Jul. 12, 2022

(54) AUTOMATIC CREATION OF TEXT-ON-PATH GRAPHIC ALONG COMPLEX PATHS

(71) Applicant: ADOBE INC., San Jose, CA (US)

(72) Inventors: Tarun Gehlaut, Haryana (IN); Siddharth Bhasin, New Delhi (IN)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 17/075,848

(22) Filed: Oct. 21, 2020

(65) Prior Publication Data

US 2022/0122301 A1    Apr. 21, 2022

(51) Int. Cl.
| | |
|---|---|
| *G06T 11/20* | (2006.01) |
| *G06F 40/109* | (2020.01) |
| *G06T 7/13* | (2017.01) |
| *G06T 11/60* | (2006.01) |

(52) U.S. Cl.
CPC .......... *G06T 11/203* (2013.01); *G06F 40/109* (2020.01); *G06T 7/13* (2017.01); *G06T 11/60* (2013.01)

(58) Field of Classification Search
CPC ... G06T 11/60; G06T 2200/24; G06T 11/203; G06T 7/13; G06F 40/109
See application file for complete search history.

(56) References Cited

U.S. PATENT DOCUMENTS

| | | | | |
|---|---|---|---|---|
| 7,315,979 | B1 * | 1/2008 | Walker .................. | G06F 3/0483 715/234 |
| 8,026,923 | B1 * | 9/2011 | Gupta ..................... | G09G 5/26 345/581 |
| 8,584,012 | B1 * | 11/2013 | Orshanskiy .......... | G06T 11/203 715/264 |
| 8,881,038 | B1 * | 11/2014 | Palmer .................... | G06T 11/20 715/764 |
| 10,366,518 | B2 * | 7/2019 | Dhanuka ................. | G06T 11/60 |
| 2003/0200236 | A1 * | 10/2003 | Hong ........................ | G06T 7/49 708/200 |
| 2007/0195095 | A1 * | 8/2007 | Gerhard ................ | G06F 40/103 345/467 |
| 2008/0297514 | A1 * | 12/2008 | Pedersen ................. | G06T 11/40 345/442 |

(Continued)

OTHER PUBLICATIONS https://www.photoshopessentials.com/basics/type-on-a-path/ Jul. 2016 article "Create Type on a Path in Photoshop".

(Continued)

*Primary Examiner* — Jin Cheng Wang
(74) *Attorney, Agent, or Firm* — F. Chau & Associates, LLC

(57) ABSTRACT

A text-on-path graphic is automatically created from entered text and a drawn shape having a complex path. Shape boundary curves are identified from the shape. A set of overlapping boundary curves is determined from the shape boundary curves. The set of overlapping boundary curves is combined into a combined curve. The combined curve and the shape boundary curves outside the set are assigned to segments of the complex path. A cost for each ordered path through the segments is determined, where the cost of each ordered path is based on a distance to a next segment and a length of the next segment. The text-on-path graphic is then created from the text and the ordered path having the lowest cost.

19 Claims, 13 Drawing Sheets

(56) References Cited

U.S. PATENT DOCUMENTS

| | | | | |
|---|---|---|---|---|
| 2010/0097399 A1* | 4/2010 | Rajagopalan | ...... | G01C 21/3673 |
| | | | | 345/636 |
| 2014/0035926 A1* | 2/2014 | Burago | ................ | G06T 11/203 |
| | | | | 345/441 |
| 2015/0022546 A1* | 1/2015 | Perry | .................... | G06T 11/203 |
| | | | | 345/611 |
| 2017/0322910 A1* | 11/2017 | Dhanuka | ................ | G06T 11/60 |

OTHER PUBLICATIONS https://www.lifewire.com/type-on-a-path-in-illustrator-1701850, Apr. 2020 article "Type on a path in Illustrator".

\* cited by examiner

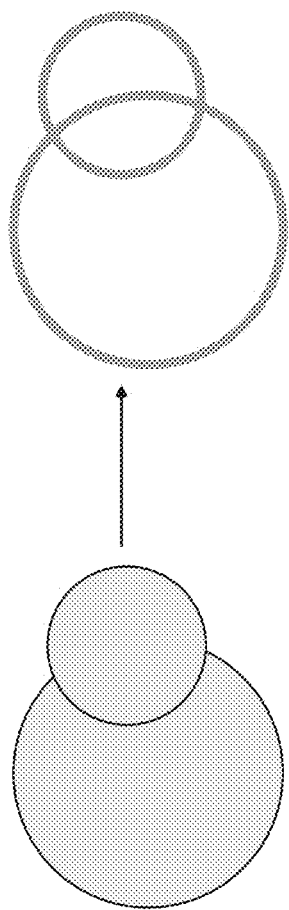

AUTOMATIC CREATION OF TEXT-ON-PATH GRAPHIC ALONG COMPLEX PATHS

TECHNICAL FIELD

This disclosure relates to creation of text-on-path graphics, and more particularly, to techniques for creating text-on path graphics along complex paths.

BACKGROUND

A text-on-path graphic or path text is a variation of artistic text which follows a line, a curve, or an outline of a shape. Graphical editing tools that enable users to create text-on-path graphics allow users to place text along Bezier paths. The path acts as a baseline for glyphs of the text to be added.

A text-on-path function has become an important differentiating feature among illustrator applications on tablet computers. This is evidenced by feedback received from users indicating that a text-on-path feature is much more fun and intuitive on a touch device.

While text-on path functionality is relatively straight forward for simple paths, such functionally is not supported for complex paths such as compound paths or a group of simple paths. For example, a user may be greeted with an alert dialog when attempting to add text to a complex shape. The user is forced to manually break up these complex paths into simpler paths and then create multiple independent text-on-path objects, which is quite laborious and hinders the user's creative endeavor.

SUMMARY

Systems, methods, and software described herein provide a technique for enabling a user to automatically draw text (e.g., a textual graphic or object) along complex paths of a complex shape of an image (e.g., image graphic or object) to create a text-on path graphic. A list of connected objects (e.g., segments) is created automatically from the complex shape such that when text overflows on a current segment of the list, the next segment in the created list is used to render the remaining text, and so on.

The segments are derived by automatically breaking up shapes of the image into boundary curves and combining some of the overlapping boundary into combined curves. The segments are then ordered so that the flow of text on these segments is not abrupt and appears continuous.

After creating the image and the text within a graphical user interface, the user is able initiate the creation of the text-on-path graphic by dragging and dropping the image onto the text or vice versa. Further, creation of the text-on-path graphic may be initiated by using other controls of the graphical user interface such as dropdown menus, buttons or text fields.

The text-on-path graphic may include the text and the segments or just the text. Further, graphical user interface enables the user to dynamically change the initial segment and the start point from which to begin flowing the text.

In an exemplary embodiment, a method is provided for generating the text-on-path graphic from an image. In the method, shape boundary curves are located from shapes within the image. A set of overlapping boundary curves is then determined from the shape boundary curves. The set of overlapping boundary curves is combined into a combined curve. The combined curve and the shape boundary curves outside the set is assigned to segments of ae compound path. A cost for each ordered path through the segments is then determined, and the text-on path graphic is generated from the text and the ordered path having the lowest cost. The cost of each ordered path is based on a distance to a next segment and a length of the next segment.

In an exemplary embodiment, a system is provided for generating the text-on-path graphic. The system includes a computer having a memory storing an application and a processor configured to execute the application. The application includes a user interface for combining an image graphic with a textual graphic to form the text-on-path graphic. The combining is performed by the following method. A plurality of segments is determined from shapes within the image graphic. Different ordered paths are determined from the segments. An optimal one of the ordered paths is selected from lengths of the segments and distances between source and destination pairs of the segments. Flowed text is generated by flowing text of the textual graphic along the segments ordered according to the selected ordered path. The text-on-path graphic is then generated by replacing the shapes with the flowed text.

In an exemplary embodiment, a computer readable medium including instructions executable by a computing device for generating a text-on-path graphic is provided. In the instructions, for each of a plurality of segments of the input image, it is determined whether the corresponding segment is open or closed. Then, each of the segments determined to be open is added to an array. For each of the segments determined to be closed, it is determined whether the corresponding segment is part of at least one group of segments that intersect one another. Then, each of the segments determined to be closed and not part of the at least one group is added to the array. For each group present, the segments of the group is combined into a single combined segment and the single combined segment is added to the array. Different ordered paths from the segments of the array are determined. Then text is flowed along the segments according to an order of the ordered path with a lowest cost, to generate the text-on-path graphic.

BRIEF DESCRIPTION OF THE DRAWINGS

The detailed description describes embodiments with additional specificity and detail through use of the accompanying drawings, briefly described below.

FIG. 4 illustrates an example of boundary shape curves determined from an exemplary complex shape for use in the method of FIG. 2.

DETAILED DESCRIPTION OF THE EXEMPLARY EMBODIMENTS

Since an existing text-on-path function is only supported for a simple shape, a user will receive an error when attempting to apply the text-on-path function to a complex shape. An editing tool can be used to manually break up the complex shape into simple shapes. Then, the text-path function can be separately applied to each resulting simple shape to generate separate text-on-path graphics. However, it is very time consuming to use the editing tool, and management of separate text-on-path graphics requires more resources than a single text-on-path graphic. Thus, an embodiment of the disclosure provides a text-on-path function that supports complex shapes without requiring manual shape editing.

The text-on-path function enables a user to automatically draw text along a complex path of a complex shape of an image to generate a text-on-path graphic. The text-on-path function provides maximum available length of the complex path so that the text can reflow along it. Among the various segments of the complex path, an optimal ordering of these segments is determined that allow a maximum amount of content to be displayed while keeping the flow of the text continuous. Additionally, keeping the above objective in mind, since the user can select any one segment among the various segments as an initial segment, the text-on-path function is configurable so that the optimal ordering or optimal ordered path can be defined keeping the selected segment as the initial segment.

The text-on-path function includes two phases. In the first phase, complex paths are automatically broken into simpler segment and the direction of the segments is adjusted so that flow of text does not change abruptly. In the second phase, an order through the segments is automatically determined to create the desired list. Text is then automatically drawn on a first one the segments of the list until just before the text overflows, the next segment in the created list is used to render the remaining text, and so on, thereby forming a text-on-path graphic. If desired, the segments may be automatically removed to leave only the text.

Figure 1:
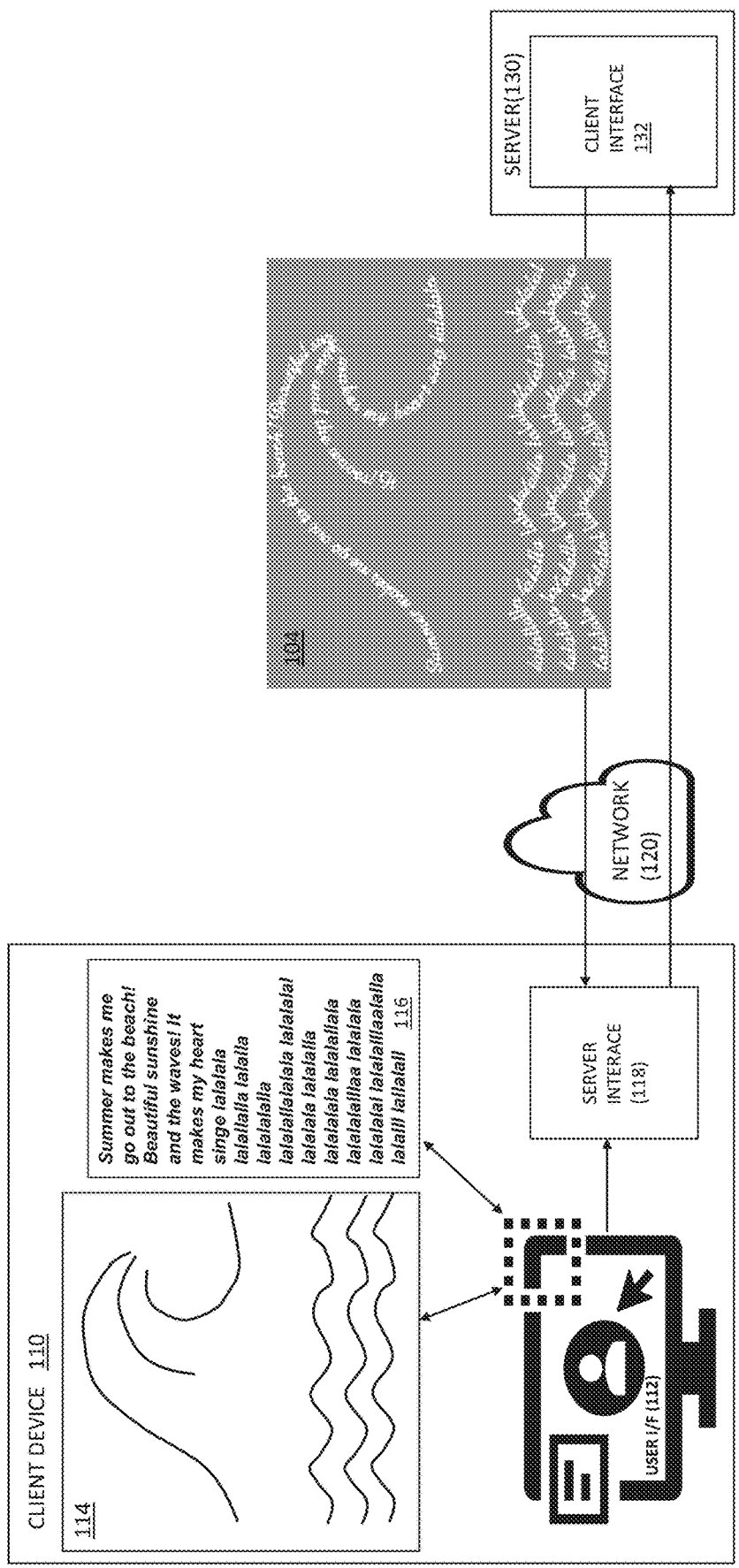
FIG. 1 is an illustration of an environment in an example implementation that is operable to employ techniques described herein.

Exemplary embodiments of the inventive concept are applicable to a client-server environment and a client-only environment. FIG. 1 shows an example of the client-server environment, where a user uses a graphical user interface 112 of a client device 110 to create graphics including a complex shape 114 and text 116, a server interface 118 of the client device 110 sends information based on the created graphics across a computer network 120, a client interface 132 of a server 130 receives the information from the computer network 120, the client interface 132 creates a text-on-path graphic 104 from the received graphics, and the client interface 132 sends the created text-on-path graphic 104 across the computer network 120 to the client device 110.

According to an embodiment of the inventive concept in a client-only environment, the client device 110 creates the text-on-path graphic 104 from the graphics itself without relying on the remote server 130. In another example of the client-server environment, instead of the graphics being created by the graphical user interface 112, the graphics are loaded from a memory accessible by the client device 110 (e.g., a secure digital (SD) card, a universal serial bus (USB) flash drive, a local memory) or received from another client device in a communication across the computer network 120 or some other network.

In at least one exemplary embodiment, the client device 110 transmits information including a complex shape 114 and text 116 across a computer network 120 to the server 130, the server 130 operates on the information to generate a text-on-path graphic 104, and the server 130 transmits the generated text-on-path graphic 104 across the computer network 120 to the client device 110.

The computer network 120 may be wired, wireless, or both. The computer network 120 may include multiple networks, or a network of networks, but is shown in a simple form so as not to obscure aspects of the present disclosure. By way of example, the computer network 12 includes one or more wide area networks (WANs), one or more local area networks (LANs), one or more public networks, such as the Internet, and/or one or more private networks. Where the computer network 120 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, the computer network 120 is not described in significant detail.

The client device 110 is a computing device capable of accessing the Internet, such as the World Wide Web. The client device 110 might take on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device.

The client device 110 includes one or more processors, and one or more computer-readable media. The computer-readable media may include computer-readable instructions executable by the one or more processors. The instructions may correspond to one or more applications, such as software to enable the user draw graphics including complex shapes and text, to merge a complex shape with the text to generate a text-on-path graphic, and to interface with the server 130 for transmitting information including a complex shape and text and receiving a text-on-path graphic.

The server 130 includes a plurality of computing devices configured in a networked environment or includes a single computing device. Each server computing device includes one or more processors, and one or more computer-readable media. The computer-readable media may include computer-readable instructions executable by the one or more processors. The instructions may correspond to one or more applications, such as software to interface with the client device 110 for receiving information including a complex shape and text, to merge the complex shape with the text to generate a text-on-path graphic, and to interface with the client device 110 for transmitting the a text-on-path graphic.

Figure 2:
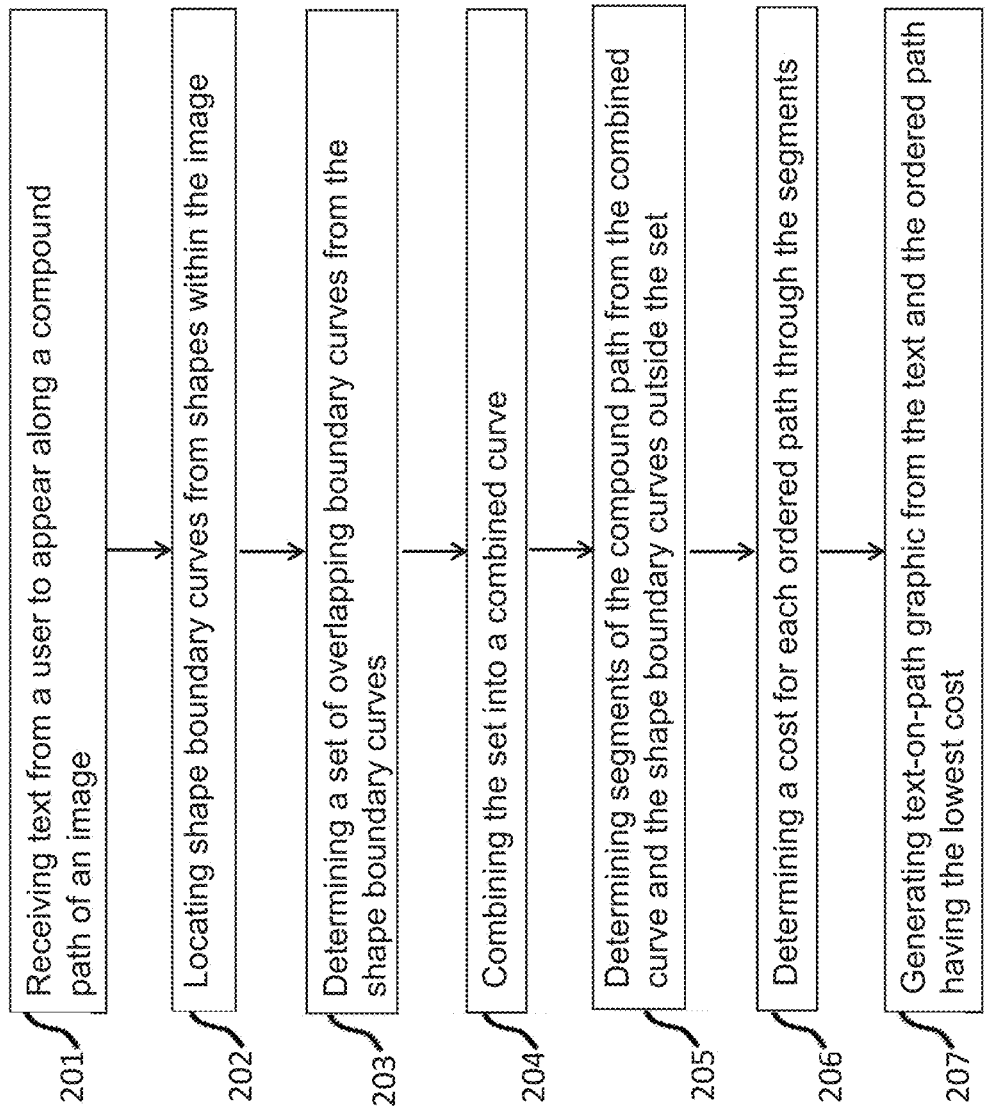
FIG. 2 illustrates a method of generating a text-on-path graphic from a complex shape and text according to an exemplary embodiment of the disclosure.

FIG. 2 illustrates a method of generating a text-on-path graphic according to an exemplary embodiment of the disclosure for use by the client device 110 or the server 130.

The method of FIG. 2 includes receiving text from a user to appear along a compound path of an image (step 201). The text 116 shown in FIG. 1 is an example of the text. In an exemplary embodiment of the disclosure, the user interface 122 is a graphic editing program such as ADOBE ILLUSTRATOR® or ADOBE PHOTOSHOP®. In an exemplary embodiment of the disclosure, the user uses one or more controls of the graphic editing program to create a text graphic (or textual graphic) including the text and to create a shape graphic of the image including one or more shapes, to be used in forming a text-on-path object. For example, in FIG. 1, the shape graphic is that of a crashing wave and ripples including several curves. After the text and shape graphics have been created, the user may use a control of the graphic editing program to initiate the creation of the text-on-path graphic. In an exemplary embodiment of the disclosure, the user uses a pointing device (e.g., a mouse) to drag and drop the text object onto the graphic object or to drag and drop the graphic object onto the text object to initiate the creation of the text-on-path graphic. In an exemplary embodiment of the disclosure, the user selects a text-on-path graphic option that queries the user to enter the text into a text field and then to select or create a shape graphic to initiate the creation of the text-on-path graphic.

The method of FIG. 2 further includes locating shape boundary curves from shapes within the image (step 202). In an exemplary embodiment of the disclosure, a shape boundary curve is located by identifying boundary pixels of a shape. For example, the boundary pixels of a filled circle would be the pixels along the circumference of the circle, and the boundary pixels of a filled rectangle would be the pixels along the perimeter of the rectangle. While examples above are described with respect to a circle and a rectangle, embodiments of the disclosure are not limited to any particular shape. Further, the thickness of the identified boundary pixels is not limited to any particular number of pixels. In an exemplary embodiment, the shape boundary curves are located by passing the image through an edge detection filter or applying an edge detection algorithm to the image.

The method of FIG. 2 further includes determining a set of overlapping boundary curves from the shape boundary curves (step 203). For example, performing this step on an image of the Olympic Rings would result in a set of five overlapping rings (or annuluses). If the image of the Olympic Rings included two additional curves that do not overlap one another and do not overlap any of the other rings, the set would not the two additional curves.

The method of FIG. 2 further includes combining the determined set of overlapping boundary curves into a combined curve (step 204). In an exemplary embodiment of the disclosure, the combining is performed by determining points of the set of overlapping boundary curves that form a concave hull and connecting the points together. A convex hull is the smallest convex polygon derived from a set of points that encloses all the points in the set. A concave hull is a polygon that includes points of the convex hull, but has less area or a minimal area as compared to the convex hull. In an exemplary embodiment, the concave hull is representative of intersecting paths text is to reflow along. The intersection of these paths may be computed efficiently using R-trees. An R-tree is a tree data structure used to group nearby objects and represent them with their minimum bounding rectangle in the next higher level of the tree, where 'R' in R-tree stands for rectangle. In an exemplary embodiment of the disclosure, the combining is performed by performing a union operation on the set of overlapping boundary curves.

The method of FIG. 2 further includes determining segments of the compound path from the combined curve and the shape boundary curves outside the set (step 205). The combined curve is one of the segments and each of the other non-overlapping shape curves are also segments. In the example above with the image of the six Olympic Rings and two additional non-overlapping curves, there would be three segments, namely one segment from combining the six boundary curves of the rings and one segment for each of the non-overlapping curves. In an exemplary embodiment of the disclosure, the determining of the segments further includes changing directions of the segments to have a same direction. For example, if the segments include four non-overlapping curves, and three of the curves have a direction pointing to the right and one of the curves has a direction pointing to the left, then the curve point to the left is flipped so it points to the right.

The method of FIG. 2 further includes determining cost for each ordered path through the segments (step S206). For example, there are six possible paths when there are three segments present. For example, when N segments are present, there may be N factorial possible paths. In an exemplary embodiment, the segments of a given one of the ordered paths can be considered nodes in a connected graph, where the first segment of the path is connected to a second segment of the path via a first edge, the second segment of the path is connected to a third segment of the path via a second edge, and so on. In an exemplary embodiment of the disclosure, the cost of the given ordered path is calculated from the edge costs of each edges. In an exemplary embodiment of the disclosure, an edge cost of an edge is based on an equation that considers the distance between the segments of the edge and the length from a source segment of the segments of the edge and a destination segment of the segments of the edge. In an exemplary embodiment of the disclosure, the equation favors smaller distances between segments and destination segments of a larger length. For example, if there are three segments of equal lengths, and the second segment is further from the first segment than the third segment, then the cost of going from the first segment to the third segment is less than the cost of going from the first segment to the second segment. For example, if there are three segments and the second and third segments are an equal distance away from the first segment, the cost of going from the first segment to the second segment is less than the cost of going from the first segment to the third segment when the second segment is longer than the third segment.

The method of FIG. 2 further includes generating a text-on-path graphic from the text and the ordered path having the lowest cost (step 207). For example, if the costs determined for all of the ordered paths is sorted from lowest to highest into a sorted list, and then the path associated with the first cost in the sorted list is the ordered path with the lowest cost.

In an exemplary embodiment of the disclosure, flowed text is generated by flowing the text along the segments of the ordered path having the lowest cost. In an embodiment, flowing of the text includes drawing as many whole words of the text as will fit along a current segment of the lowest cost ordered path at an orientation of the segment, advancing to a next segment, and repeating the drawing step until all the words have been drawn. In an exemplary embodiment, once the text has been drawn, the segments are removed. Thus, the segments are replaced with the text.

Figure 3:
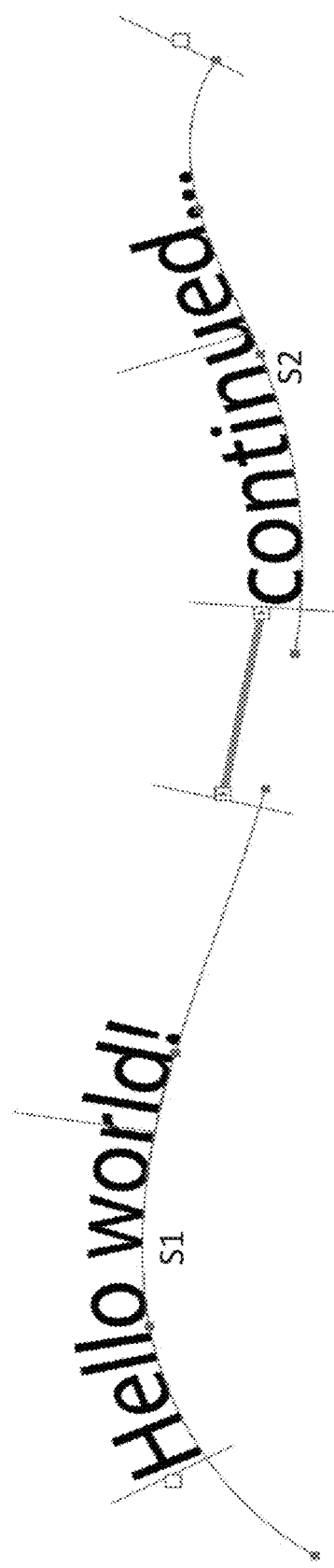
FIG. 3 illustrates exemplary segments generated while performing the method of FIG. 2.

In an exemplary embodiment of the disclosure, the text-on-path graphic is generated by a processor rendering (or drawing) whole words of the text along a current segment of the ordered path with the lowest cost until no more whole words fit without overflowing or until no more words remain, and then repeating this process for each next segment of the path if any words remain. FIG. 3 illustrates an example where two segments (curves) have been derived from the image, namely a first segment S1 and a second segment S2, both having a same direction. In this example, the text is "Hello word! continued", and since only the first two words can fit on the first segment S1, the remaining word is rendered on the second segment.

In an exemplary embodiment of the disclosure, the text-on path graphic only includes the text. For example, instead of rendering the text along or the segments, the text is rendered along positions of the segments. In another example, the text is rendered along the segments, but then the segments are later removed from the image.

As discussed above with respect to step S202, a shape boundary curve may be located by identifying boundary pixels of a shape. FIG. 4 illustrates an example of identifying shape boundary curves of a complex shape including overlapping filled circles. The left side of FIG. 4 illustrates the complex shape, and the right side of FIG. 4 illustrates the boundary shape boundary curves determined from the complex shape.

Figure 5A:
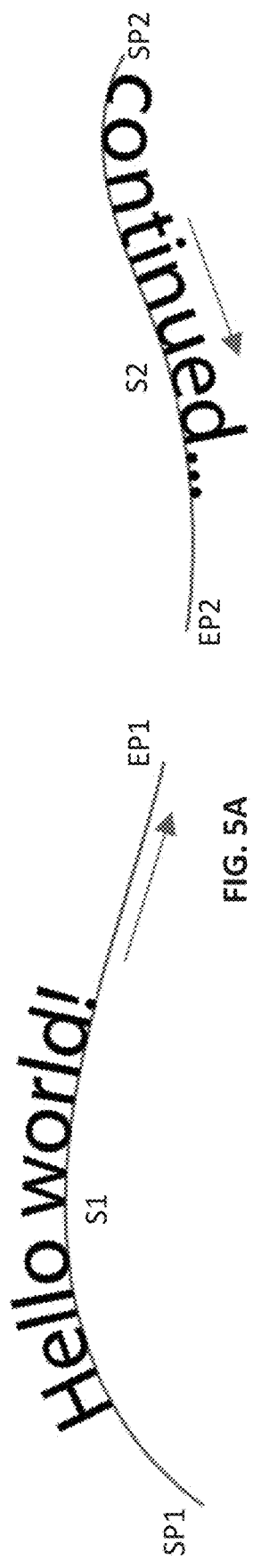
FIG. 5A illustrates exemplary segments having different directions.
Figure 5B:
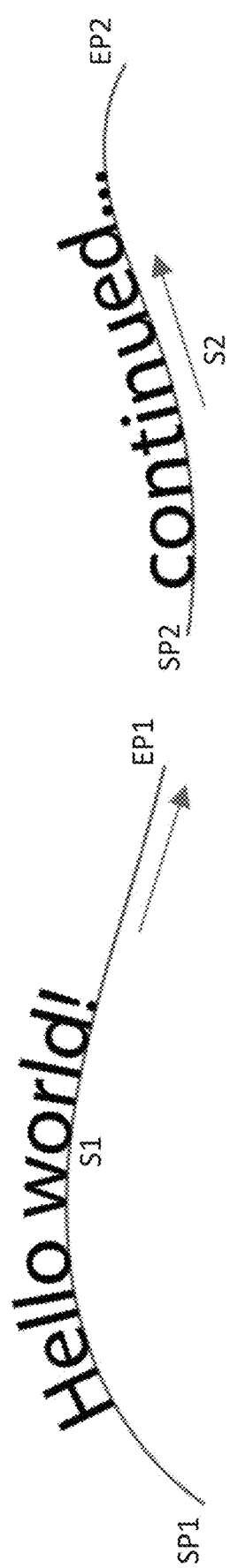
FIG. 5B illustrates the exemplary segments of FIG. 5A adjusted to have the same direction.

As discussed above with respect to step 205, the determining of the segments may include changing directions of the segments to have a same direction. FIG. 5A illustrates when the segments have different directions. Accordingly, without changing of the directions, and the text is flowed along the segments, the word along the second segment S2 would appears upside down relative to the words along the first segment S1. FIG. 5B illustrates when the segments have been adjusted to have the same direction. For example, a reflection transformation may be performed on the second segment S2 so that it is has the same direction as the first segment S1.

Figure 6:
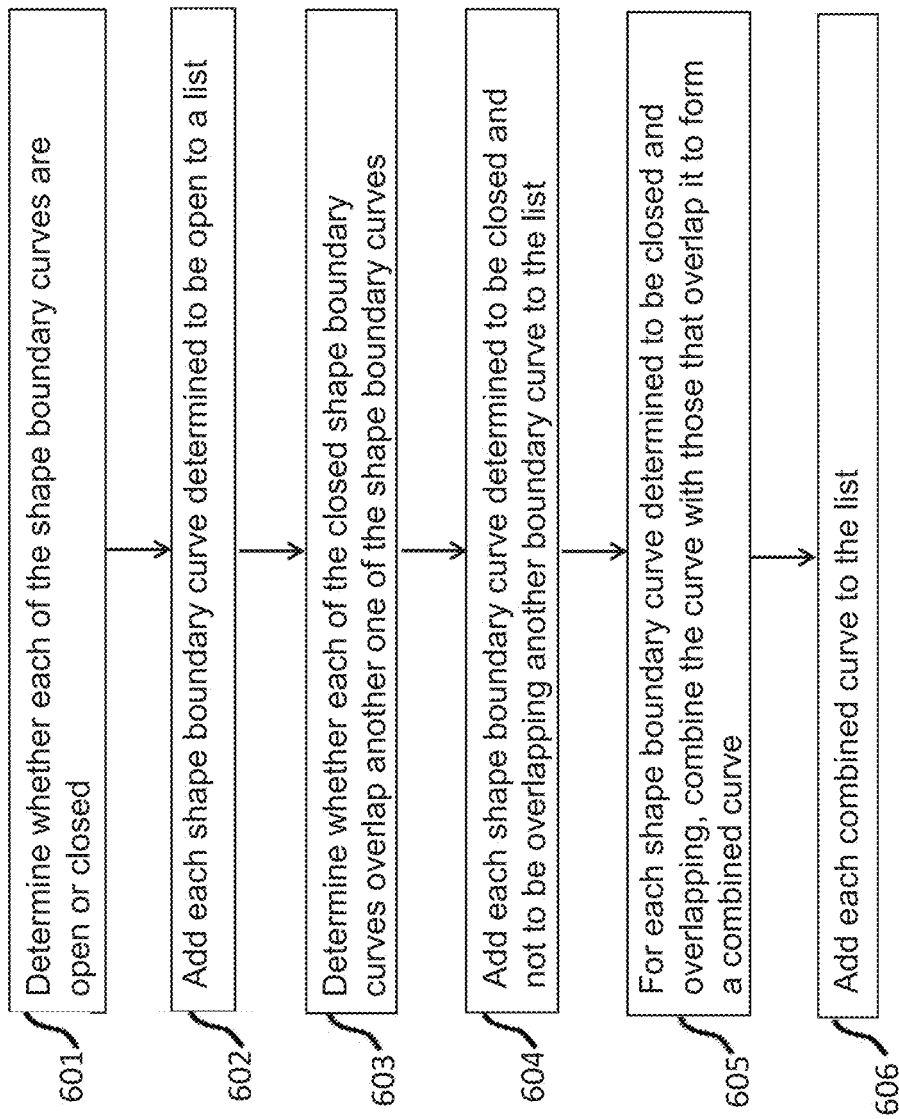
FIG. 6 illustrates a method of determining the segments of a complex shape according to an exemplary embodiment of the disclosure for use in the method of FIG. 2.

FIG. 6 illustrates a method of determining segments from the image according to an exemplary embodiment of the disclosure. In an exemplary embodiment of the disclosure, steps 203-205 of FIG. 2 are performed by the method of FIG. 6.

Figure 7:
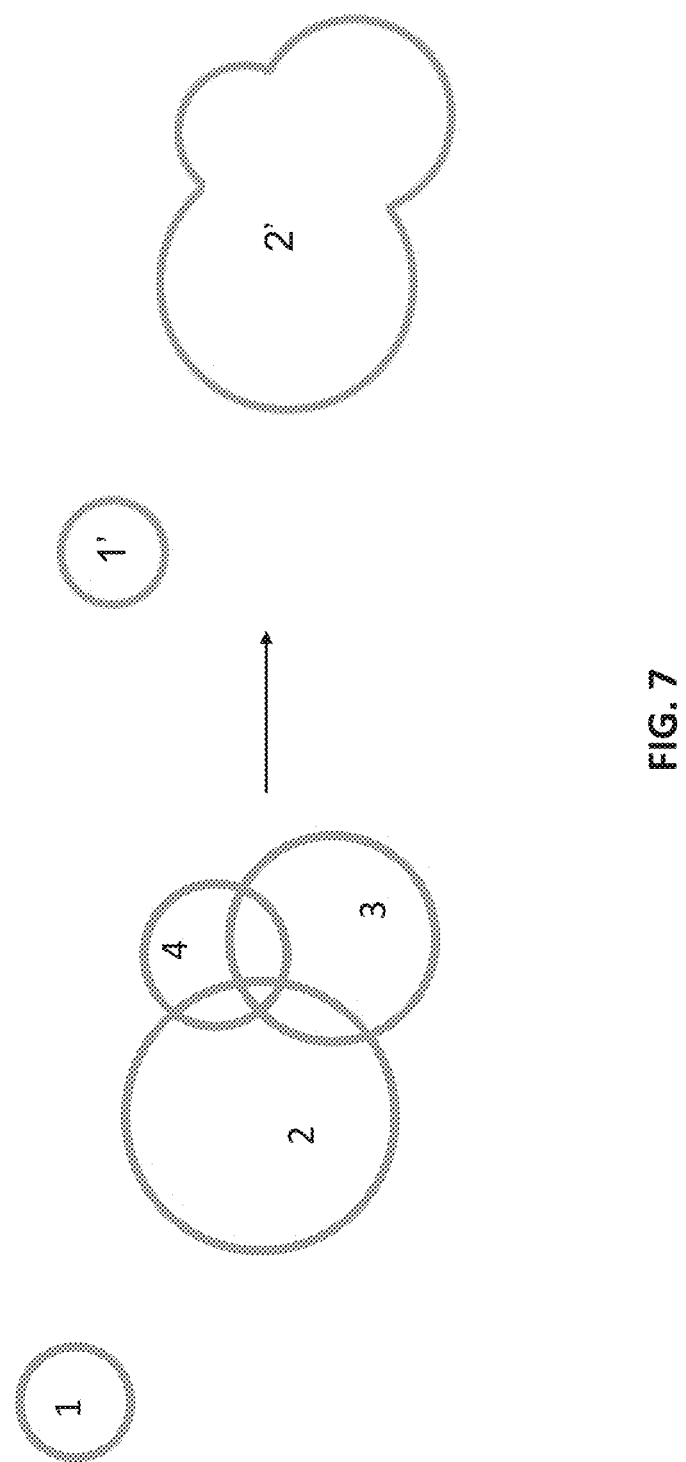
FIG. 7 illustrates an example of converting boundary shape curves into segments for use in the methods of FIG. 2 or FIG. 6.

The method of FIG. 6 includes determining whether each of the shape boundary curves are open or closed (step 601). An open curve is a curve with end points that do not join up. A closed curve is a curve that has no open ends. In the shape boundary curves shown in FIG. 7, each of the shape boundary curves are closed.

The method of FIG. 6 further includes adding each shape boundary curve determined to be open to a list (or an array) (step 602). Each open shape boundary curve added to the list may be referred to as a segment. Since the shape boundary curves in FIG. 7 do not include any open curves, when this step is performed on FIG. 7, no curves are added to the list.

The method of FIG. 6 further includes determining whether each of the closed shape boundary curves overlap (or intersect) another one of the shape boundary curves (step 603). For example, when at least one point of a closed shape boundary curve occupies a same coordinate as a point of another open or closed shape boundary curve, the closed shape boundary curve is considered to be overlapping. As shown in the left side of FIG. 7, the first curve 1 is closed and does not overlap any other curve, and the second through third curves 2-4 are closed and overlap one another.

The method of FIG. 6 further includes adding each shape boundary curve determined to be closed and not to be overlapping another boundary curve to the list (step 604). Thus, the first curve 1 in the left side of FIG. 7 would be added to the list as a first segment 1' as shown in the right side of FIG. 7.

The method of FIG. 6 further includes, for each shape boundary curve determined to be closed and overlapping, combining the curve with those that overlap it to form a combined curve (step S605). Thus, the second through fourth curves 2-4 in the left side of FIG. 7 would be combined to form a combined curve or combined segment 2' as shown in the right side of FIG. 7. For example, a concave hull or union operation may be performed on the second through fourth curves to generate the combined curve or segment 2'.

The method of FIG. 6 further includes adding each combined curve to the list (step 606). For example, the combined segment 2' shown in the right side of FIG. 7 would be added to the list. Thus, after the method of FIG. 6 is applied to the shape boundary curves, the list would include two segments 1' and 2'.

As discussed in step 206 of FIG. 2, a cost is determined for each ordered path through the segments. For example, since FIG. 7 resulted in two segments in the list, there would be two possible paths, a first path from segment 1' to segment 2' and a second path from segment 2' to segment 1'. The list of segments is re-ordered based on the path having the lowest cost. The re-ordering may result in a flow of text across the segments that is not abrupt and appears continuous. For example, when reading text, a user would prefer less movement of their eyes/head when moving from one text-on-path to the other.

Figure 8A:
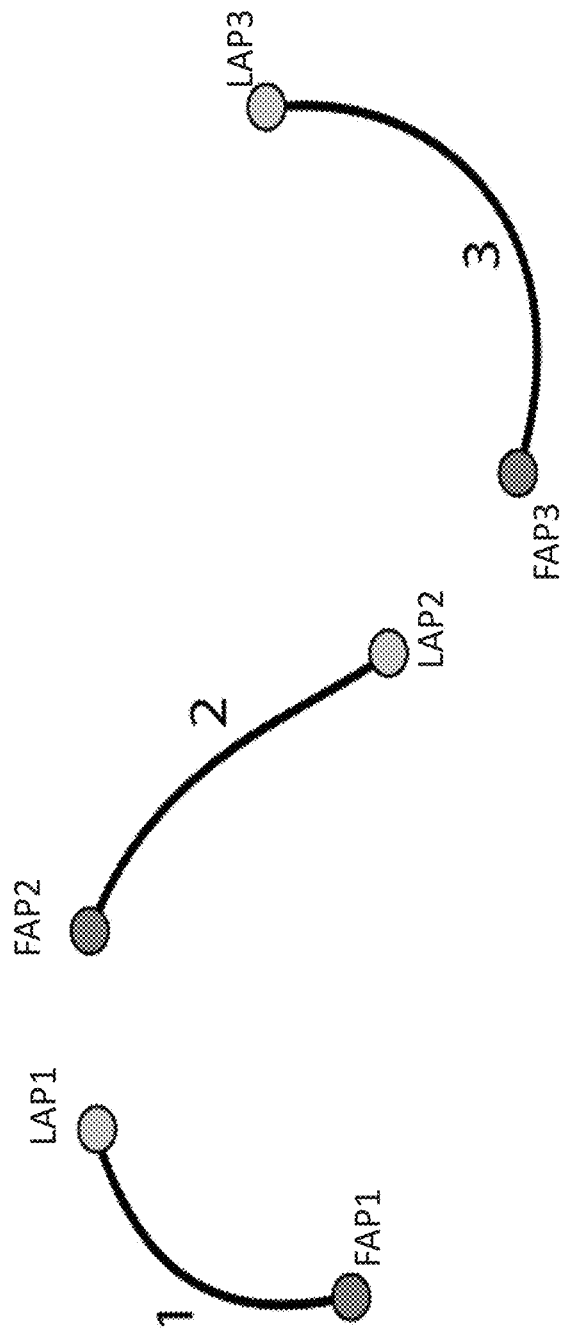
FIG. 8A illustrates exemplary segments for use in determining using the methods of FIG. 2 or FIG. 6.

The problem of finding the appropriate order may be modeled as a graph problem. The segments in the list (the resultant vector) are considered nodes of the graph. The edge between a pair of nodes is defined as a linear combination of a distance D between a source segment and a destination segment and a length Len of the destination segment. In an exemplary embodiment of the disclosure, the distance D is the distance between a last anchor point of the source segment and a first anchor point of the destination segment. FIG. 8A includes a first segment 1 having a first anchor point FAP1 and a last anchor point LAP1, a second segment 2 having a first anchor point FAP2 and a last anchor point LAP2, and a third segment 3 having a first anchor point FAP3 and a last anchor point LAP3, when the direction of the path goes to the right sequentially through the segments. If the first segment 1 is the source segment and the second segment 2 is the destination segment, then the distance would be the distance between LAP1 and FAP2. If the second segment 2 is the source segment and the first segment 1 is the destination segment, then the distance would be the distance between LAP2 and FAP1.

Figure 8B:
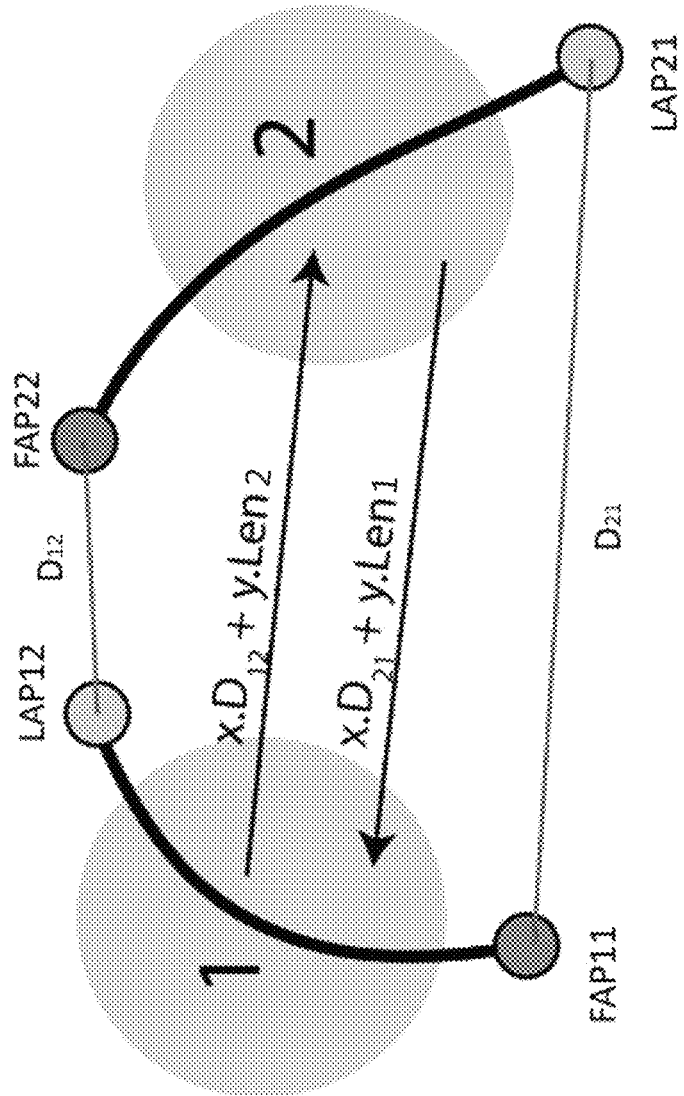
FIG. 8B illustrates exemplary costs of paths through the segments of FIG. 8A.

FIG. 8B is an illustration of the first and second segments of FIG. 8A as first and second nodes of a graph, where a first path goes from node 2 to node 1 along a first edge, and a second path goes from node 1 to node 2 along a second edge. The positions of the first and last anchor points vary based on the direction of the path. For example, since the first path goes to the left, the last anchor point LAP21 is located on the right endpoint of the second segment and the first anchor point FAP11 is located on the left endpoint. For example, since the second path goes to the right, the last anchor point LAP12 is located on the right endpoint of the first segment and the first anchor point FAP22 is located on the left endpoint of the second segment.

The edge cost of a given edge of the graph is calculating according to Equation 1.

$$\text{Edge Cost} = (x^*D) + (y^*Len) \quad \text{[Equation 1]}.$$

The overall cost of flowing text from a source node to other nodes is minimized such that all nodes are utilized. The distance between the last anchor point LAP21 and the first anchor point FAP11 of a path from LAP21 to FAP11 is represented by $D_{12}$ and the length of the destination segment of the path represented by Len2. The distance between the last anchor point LAP12 and the first anchor point FAP22 of path from LAP12 to FAP22 is represented by $D_{21}$ and the length of the destination segment of the path represented by Len1. In this example, $D_{12}$ is less than $D_{21}$, but embodiments of the disclosure are not limited thereto. According to the above equation and as shown in FIG. 8B, the edge cost of flowing text from the second node to the first node along Path$_1$ is $(x^*D_{21})+(y^*Len1)$), and the edge cost of flowing text from the first node to the second node along Path$_e$ is $((x^*D_{12})+(y^*Len2)$. The term $(x^*D)$ in Equation 1 may be referred to as a first parameter or coefficient and the term $(y^*Len)$ in Equation 1 may be referred to as a second parameter or coefficient.

In an exemplary embodiment of the disclosure, destination segments of a larger length Len and smaller distances D are favorable. Thus, in Equation 1, signs of parameters x and y are opposite to one another. In an exemplary embodiment of the disclosure, parameter x is positive and parameter y is negative. In an exemplary embodiment of the disclosure, x=0.9 and y=−0.1. However, embodiments of the disclosure are not limited any particular pair of parameter values.

The overall cost of a certain ordered path through a given group of segments may be determined by summing the edge costs. For example, if there are three segments, the overall cost of a forward sequential path through the segments would be the sum of the edge cost of flowing text from the first segment to the second segment and the edge cost of flowing text from the second segment to the third segment, and the overall cost of a backward sequential path through the segments would be the sum of the edge cost of flowing text from the third segment to the second segment and the edge cost of flowing text from the second segment to the first segment.

In an exemplary embodiment of the disclosure, the cost of the ordered path through the segments with the lowest cost is determined by using a Genetic Algorithm based solution to the Travelling Salesman Problem, which minimizes the overall cost. In another exemplary embodiment of the disclosure, the cost of the ordered path through the segments with the lowest cost is determined by using a Greedy Approach. In the Greedy Approach, the next node to advance to, is the one having the least cost when transitioning from the current node.

In an exemplary embodiment of the disclosure, the initial segment of all possible ordered paths is the same. For example, the initial segment could be a segmented derived from a first shape drawn by a user from among other shapes making up the complex shape, or derived from one of the shapes selected by the user from among the various shapes of the complex shape. For example, if the segments include first through third segments, and the initial segment is the first segment, there are only two possible paths, namely a first segment->second segment->third segment path and from a first segment->third segment->second segment path.

In an exemplary embodiment of the disclosure, a group object including a set of connected (e.g., linked) text-on-path objects is then created from the segments of the ordered path having the least cost, according to the order of the segments in the ordered path. For example, if the resulting list includes three segments in an order of first segment followed by the third segment and then the second segment, then the group object includes first through third text-on path objects. The first text-on-path object includes a first graphic of the first segment, first word(s) of the text capable of fitting on the first segment, and a first parameter that indicates the first text-on-path object is connected to the second text-on-path object. The second text-on-path object includes a second graphic of the second segment, second word(s) of the text capable of fitting on the second segment, and a second parameter that indicates the second text-on-path object is connected to the first and third text-on-path objects. The third text-on-path object includes a third graphic of the third segment, remaining word(s) of the text capable of fitting on the third segment, and a third parameter that indicates the third text-on-path object is connected to the second text-on-path object.

In an exemplary embodiment of the disclosure, the segments of the group object are removed so that only the text remains. For example, as shown in FIG. 1, the text-on-path graphic 104 does not includes the curves of the complex shape 114. While the text-on-path graphic 104 is shown in FIG. 1 having different colors from the complex shape, exemplary embodiments of the disclosure are not limited thereto. For example, the text in the text-on-path graphic 104 may have the same color as the curves of the complex shape 114 and a color of the background of the text-on-path graphic 104 may be the same as a color of the background of the complex shape 114.

Figure 9A:
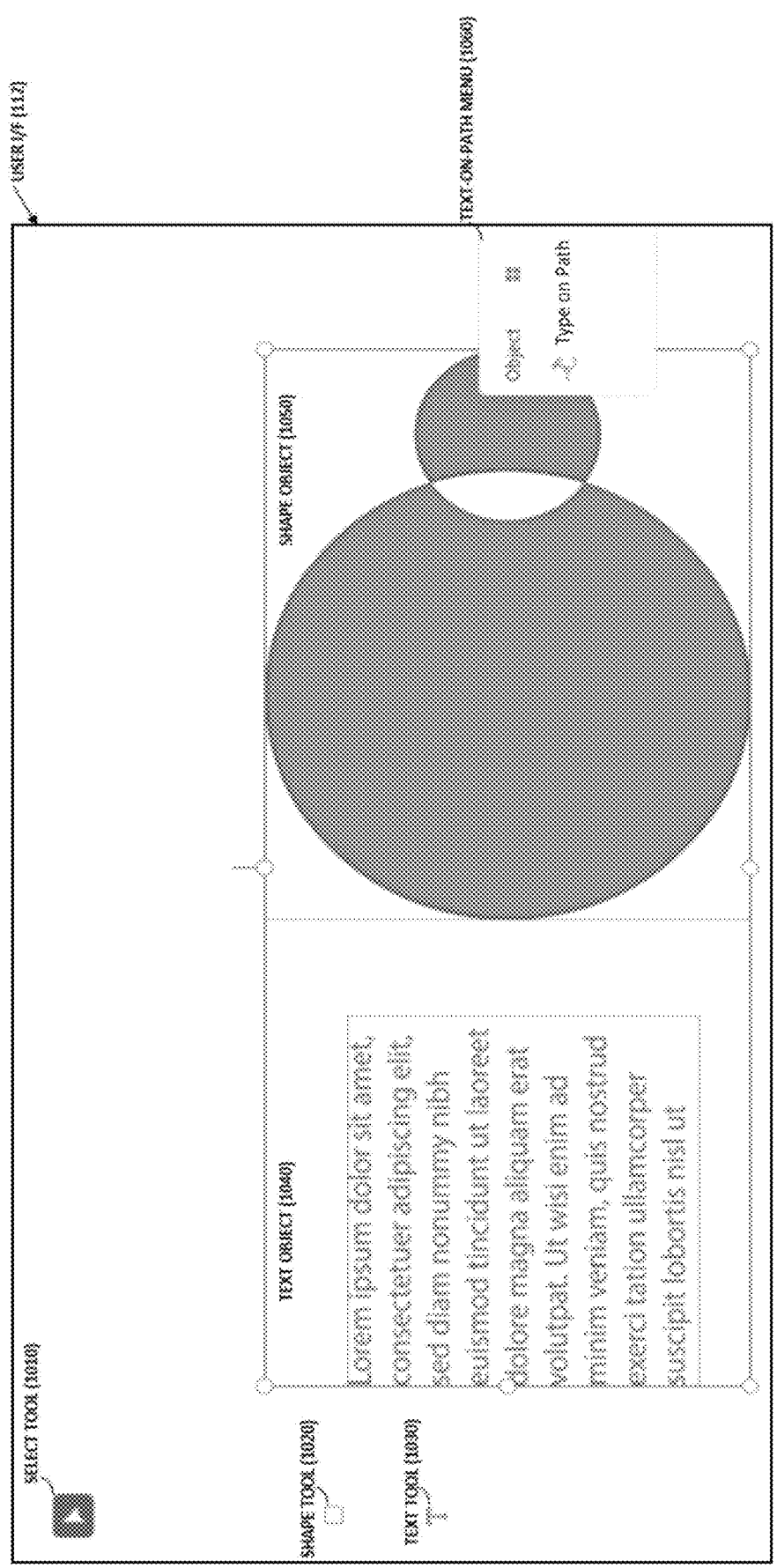
FIG. 9A illustrates an exemplary user interface for enabling a user to create a text-on-path graphic.
Figure 9B:
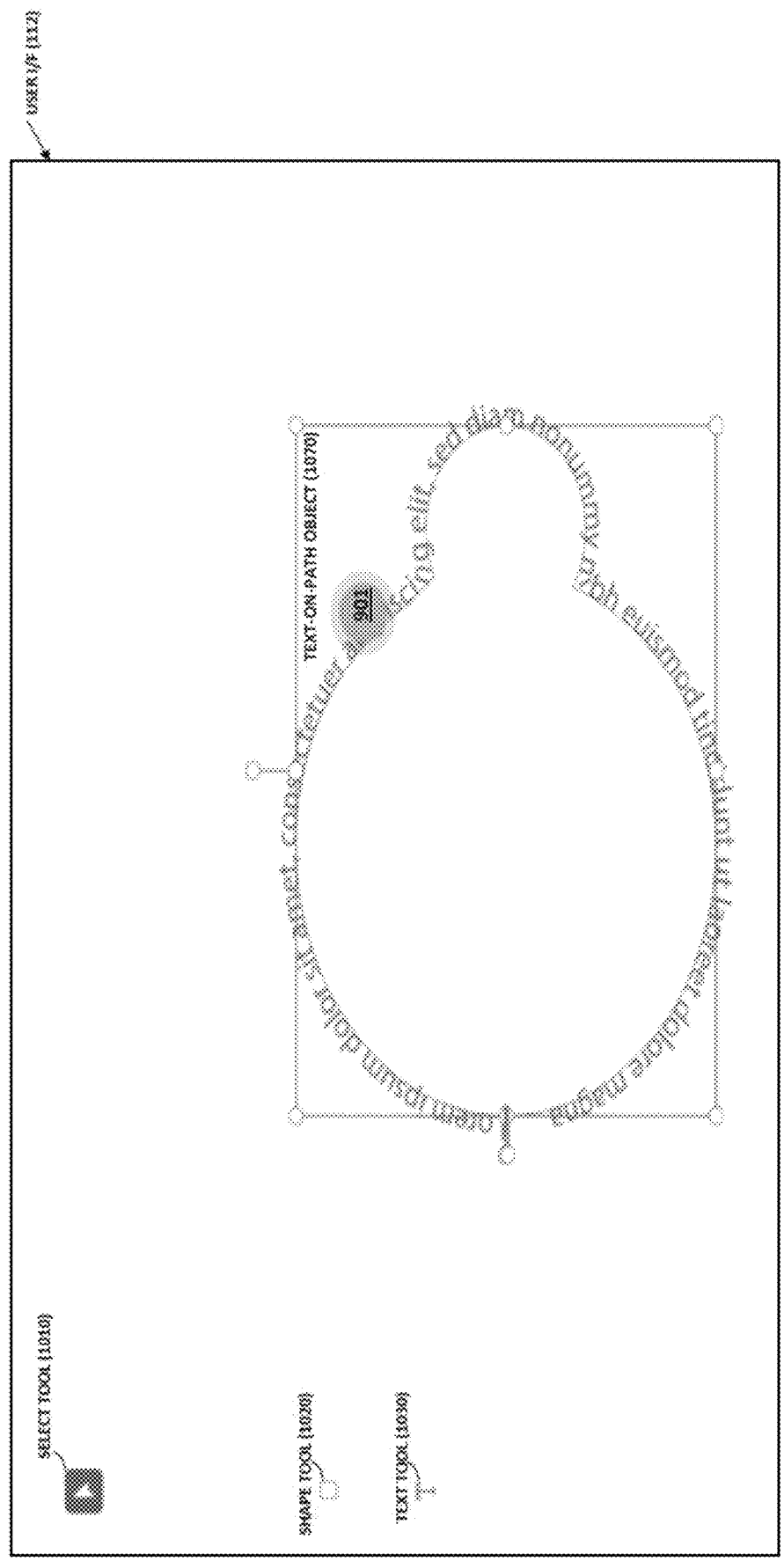
FIG. 9B illustrates an exemplary text-on-path graphic created from the user interface of FIG. 9A.
Figure 9C:
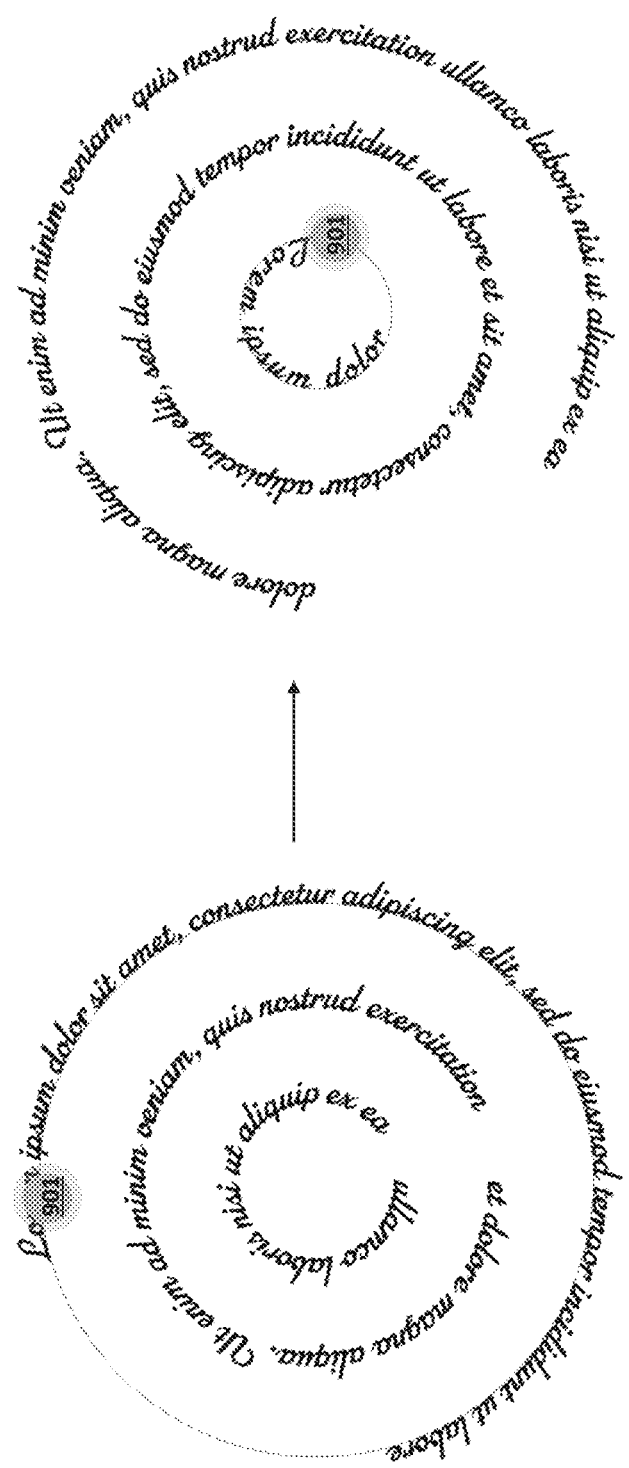
FIG. 9C illustrates use of a tool of the user interface of FIG. 9B to adjust the position of text of a text-on-path graphic.

FIG. 9A illustrates the graphical user interface 112 according to an exemplary embodiment of the disclosure. The graphical user interface 112 includes a select tool 1010, a shape tool 1020 and a text tool 1030. The user graphical user interface 112 may include tools or functions in addition to those illustrated. The text tool 1030 may be selected by a user using a pointing device and then the user may use a keyboard to enter text for creating a text object 1040. The shape tool 1020 may be selected by a user using the pointing device and then the user may use the pointing device to draw one or more shapes (e.g., rectangles, circles, etc.) to create a shape object 1050. The user can then use a pointing device to select the select tool 1010, and then select both the text object 1040 and the shape object 1050 to open a text-on-path menu 1060, and then select an option on the text-on-path menu 1060 (e.g., "Type On Path") to initiate creation of a text-on-path object including a text-on-path graphic created using the above-described methods. FIG. 9B illustrates an example of the text-on-path object 1070 created from the text object 1040 and the shape object 1050 shown in FIG. 9A. The user interface 112 of FIG. 9B further includes a control pin 901 to enable the user to move the start point of text of the text-on-path object 1070 to a new location. FIG. 9C illustrates an example of the control pin 901 being used to move text of a text-on-path object to a new location on a text-on-path object. The left side of FIG. 9C shows the text starting on an outermost segment and flowing to the innermost segments. The right side of FIG. 9C shows that text moving to start from the innermost segment and flowing to the outermost segment after the user drags the control pin 901 from a point on the outermost segment to a point on the innermost segment.

Aspects and implementations for automatically generating text-on-path graphics have been described in the general context of various steps and operations. A variety of these steps and operations are performed by hardware components or are embodied in computer-executable instructions, which cause a general-purpose or special-purpose processor (e.g., in a computer, server, or other computing device) programmed with the instructions to perform the steps or operations. For example, the steps or operations are performed by a combination of hardware, software, and/or firmware.

Figure 10:
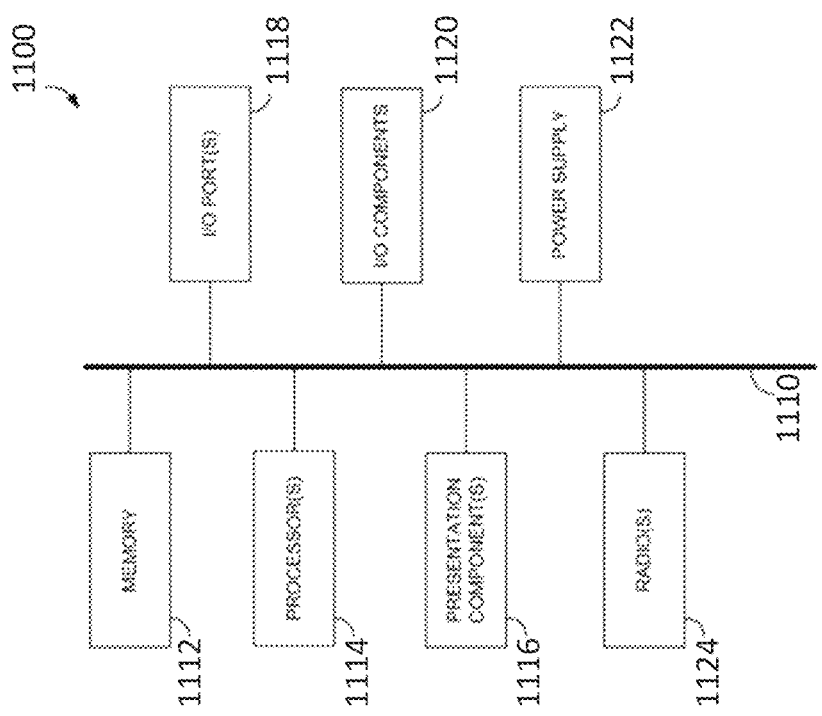
FIG. 10 illustrates an exemplary operating environment for implementing embodiments of the present invention.

Having described implementations of the present disclosure, an exemplary operating environment in which embodiments of the present invention may be implemented is described below to provide a general context for various aspects of the present disclosure. Referring initially to FIG. 10 in particular, an exemplary operating environment for implementing embodiments of the present invention is shown and designated generally as computing device 1100. The client device 110 or the server 130 may be implemented by the computing device 1100. The computing device 1100 is but one example of a suitable computing environment and is not intended to suggest any limitation as to the scope of use or functionality of the invention. Neither should the computing device 1100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 10, computing device 1100 includes bus 1110 that directly or indirectly couples the following devices: memory 1112, one or more processors 1114, one or more presentation components 1116, input/output (I/O) ports 1118, input/output components 1120, and illustrative power supply 1122. Bus 1110 represents what may be one or more busses (such as an address bus, data bus, or combination thereof). For example, one may consider a presentation component such as a display device to be an I/O component. The diagram of FIG. 10 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 10 and reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer-storage media in the form of volatile and/or nonvolatile memory. The memory may be removable, non-removable, or a combination thereof. Exemplary hardware devices include solid-state memory, hard drives, optical-disc drives, etc. For example, the text-on-path objects, the user interface 112, and the software for merging a complex shape with a text to generate a text-on-path graphic may be stored in the memory 1112 when the client device 110 is implemented by computing device 1100. The computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc. The I/O components 1120 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1100. The computing device 1100 may be equipped with depth cameras, such as, stereoscopic camera systems, infrared camera systems, RGB camera systems, and combinations of these for gesture detection and recognition.

As discussed above, at least one exemplary embodiment of the disclosure provides a method for generating a text-on-path graphic from a combined curve and other curve(s) of an image and text. In an embodiment, the text-on-path graphic is generated using flowed text. In an embodiment, the flowed text is generated by flowing the text along segments of an ordered path of the image having the lowest cost and replacing the segments with the flowed text. In an embodiment, the flowing of the text includes drawing whole words of the text sequentially along the segments of the ordered path with the lowest cost ordered path. In an embodiment, the cost of the ordered path is determined by calculating a distance between a last point of a source segment of the ordered path and a first point of a destination segment of the ordered path, determining the length of the destination segment, and determining the cost of the ordered path based on the distance and the length. In an embodiment, the cost of the ordered path based on the distance and the length is determined by determining a first parameter from the distance, determining a second parameter from the length, and summing the first and second parameters to generate the cost. In an embodiment, the first parameter is a first coefficient multiplied by the distance, the second parameter is a second coefficient multiplied by the length, and the second coefficient is negative. In an embodiment, the segments are adjusted to have a same direction. In an embodiment, the combined curve is generated by calculating a concave hull from the a set of overlapping boundary curves of the image or performing a union operation on the set. In an embodiment, a first segment of the lowest cost ordered path is one of the segments initially selected by a user.

As discussed above, at least one exemplary embodiment of the disclosure provides a system including a user interface and an application for combining segments of an image graphic to generate ordered paths, determining the optimal ordered path, and forming a text-on-path graphic from the optimal ordered path and a textual graphic. In an exemplary embodiment, the optimal ordered path is determined by calculating a cost of advancing from an initial one of the segments that is selected by a user to a destination segment among the segments that is based on a distance between the initial segment and a length of the destination segment. In an exemplary embodiment, the user interface enables a user to drag and drop the image graphic onto the textual graphic to initiate the combining. In an exemplary embodiment, the user interface enables a user to drag and drop the textual graphic onto the image graphic to initiate the combining. In an embodiment, the application determines boundary curves of each shape of the image graphic and determines the segments from the boundary curves. In an embodiment, the boundary curves are determined from applying an edge detection algorithm to the shapes.

As discussed above, at least one exemplary embodiment of the disclosure provides a computer readable medium having instructions computable by a computing device for generating a text-on-path graphic by flowing text along segments of an image according to an order of an ordered path through the segments with a lowest cost. In an embodiment, the instructions further include instructions that cause the computing device to remove the segments. In an embodiment, the cost of the ordered path is determined from lengths of each segment of the path and distances between source and destination segments of the path. In an embodiment, the segments are determined by combining a group of the segments that intersect one another by calculating a concave hull or union operation on the segments of the group.

The present invention has been described in relation to particular embodiments, which are intended in all respects to be illustrative rather than restrictive. Alternative embodiments will become apparent to those of ordinary skill in the art to which the present invention pertains without departing from its scope.

What is claimed is:

1. A computer-implemented method for generating a text-on-path graphic, comprising:
    receiving text from a user to appear along a compound path of an image;
    locating shape boundary curves from shapes within the image;
    determining a set of overlapping boundary curves from the shape boundary curves;
    combining the set of overlapping boundary curves into a combined curve;
    assigning the combined curve and the shape boundary curves outside the set to N segments of the compound path, where N is at least 2;
    determining N factorial distinct ordered paths through the segments, where each ordered path is a directed graph including the segments as nodes connected via edges having a direction;
    for each of the ordered paths,
        for each of the edges of the corresponding ordered path,
            determining an edge cost of the corresponding edge based on a distance to a next segment and a length of the next segment,
        summing the edge costs to generate a path cost;
    generating a text-on-path graphic from the text and flowing the text along the segments according to an order of the segments in the ordered path having the lowest path cost.

2. The computer-implemented method of claim 1, wherein the generating of the text-on-path graphic comprises:
    replacing the segments with the flowed text.

3. The computer-implemented method of claim 1, wherein
    the distance is between a last point of a source segment among the segments of the corresponding edge and a first point of a destination segment among the segments of the corresponding edge and the length is a length of the destination segment.

4. The computer-implemented method of claim 3, wherein the determining of the edge cost based on the distance and the length comprises:
    determining a first parameter from the distance;
    determining a second parameter from the length; and
    summing the first and second parameters to generate the cost.

5. The computer-implemented method of claim 4, the first parameter is a first coefficient multiplied by the distance, the second parameter is a second coefficient multiplied by the length, and the second coefficient is negative.

6. The computer-implemented method of claim 1, further comprising adjusting the segments to have a same direction.

7. The computer-implemented method of claim 1, wherein the combining comprises calculating a concave hull from the set of overlapping boundary curves.

8. The computer-implemented method of claim 1, wherein the combining comprises performing a union operation on the set of overlapping boundary curves.

9. The computer-implemented method of claim 1, wherein the flowing of the text comprises drawing whole words of the text sequentially along the segments of the ordered path with the lowest determined cost.

10. The computer-implemented method of claim 1, wherein a first segment of each ordered path is one of the segments initially selected by the user.

11. A computing system for generating a text-on-path graphic, the system comprising:
    a computer comprising a memory storing an application and a processor configured to execute the application,
    wherein the application includes a user interface for combining an image graphic with a textual graphic to form the text-on-path graphic,
    wherein the combining determines N segments from shapes within the image graphic, determines N factorial distinct ordered paths through the segments, selects an optimal one of the ordered paths from lengths of the segments and distances between source and destination pairs of the segments, generates flowed text by flowing text of the textual graphic along the segments ordered according to the selected ordered path, and generates the text-on-path graphic by replacing the shapes with the flowed text, where each ordered path is a directed graph including the segments as nodes connected via edges having a direction and N is at least 2, wherein the optimal one of the ordered paths has a lowest path cost among a plurality of path costs and determining of the path costs comprises:

for each of the ordered paths,
   for each of the edges of the corresponding ordered path, determining an edge cost of the corresponding edge based on a distance to
   a next segment and a length of the next segment; and
   summing the edge costs to generate a corresponding one of the path costs.

12. The computing system of claim 11, wherein the optimal ordered path is determined by calculating a cost of advancing from an initial one of the segments that is selected by a user to a destination segment among the segments that is based on a distance between the initial segment and a length of the destination segment.

13. The computing system of claim 11, wherein the user interface enables a user to drag and drop the image graphic onto the textual graphic to initiate the combining.

14. The computing system of claim 11, wherein the user interface enables a user to drag and drop the textual graphic onto the image graphic to initiate the combining.

15. The computing system of claim 11, wherein the application determines boundary curves of each of the shapes and determines the segments from the boundary curves.

16. The computing system of claim 14, wherein the boundary curves are determined from applying an edge detection algorithm to the shapes.

17. A non-transitory computer readable medium for generating a text-on-path graphic comprises instructions that, when executed by at least one processor, cause a computing device to:

for each of a plurality of shape boundary curves of an input image, determining whether the corresponding shape boundary curve is open or closed;

adding each of the shape boundary curves determined to be open, to an array as a corresponding segment;

for each of the shape boundary curves determined to be closed, determining whether the corresponding shape boundary curve is part of at least one group of shape boundary curves that intersect one another;

adding each of the shape boundary curves determined to be closed and not part of the at least one group, to the array;

for each group present, combining the shape boundary curves of the group into a single combined segment and adding the single combined segment to the array to form N segments, where N is at least 2;

determining N factorial distinct ordered paths through the segments of the array, where each ordered path is a directed graph including the segments as nodes connected via edges having a direction and N is at least 2; and flowing text along the segments according to an order of the ordered path with a lowest path cost among a plurality of path costs and determining of the path costs comprises:

for each of the ordered paths,
   for each of the edges of the corresponding ordered path, determining an edge cost of the corresponding edge based on a distance to a next segment and a length of the next segment; and
summing the edge costs to generate a corresponding one of the path costs.

18. The computer readable medium of claim 17, where the instructions further comprise instructions that cause the computing device to remove the segments.

19. The computer readable medium of claim 17, wherein the combining is performed by calculating of concave hull of the segments of the group or performing a union operation on the segments of the group.

* * * * *